Patented Sept. 15, 1931

1,823,073

UNITED STATES PATENT OFFICE

HERMANN WAGNER, OF BAD SODEN-ON-TAUNUS, MAX HESSENLAND, OF KONIGSBERG, AND RUDOLF BRUNE, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PROCESS OF PREPARING PHENYL-1-THIOGLYCOLLIC-2-CARBOXYLIC ACID AMIDES CONTAINING HALOGEN

No Drawing. Application filed December 12, 1928, Serial No. 325,642, and in Germany May 5, 1925.

The present invention relates to a process of preparing phenyl-1-thioglycollic-2-carboxylic acid amides containing halogen.

We have found that the phenyl-1-thioglycollic-2-carboxylic acid amides may be transformed into halogen substitution products by treating them with a halogen, without the starting materials further being altered in any manner.

Furthermore we have found that the process may advantageously be carried out in such a manner that the halogenation is effected in the presence of a catalyst, for instance of mercury, iodine or the like.

The following examples serve to illustrate our invention, but they are not intended to limit it thereto, the parts being by weight.

1. 26 parts of 3-methyl-5-chloro-phenyl-1-thioglycollic-2-carboxylic acid amide of the following formula:

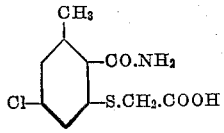

are dissolved in 250 parts of sulfuric acid of 66° Bé.; into this solution 24 parts of bromine are run in drop by drop, while stirring at 20° C. to 25° C., the whole is then stirred and poured on ice. The precipitated product is filtered by suction, dissolved in a cold sodium carbonate solution and, after the solution has become clear, again precipitated by means of a mineral acid and then crystallized from glacial acetic acid. The thus purified 3-methyl-4-bromo-5-chloro-phenyl-1-thioglycollic-2-carboxylic acid amide melts at 195° C. to 196° C. The reaction product corresponds with the formula:

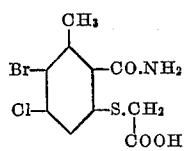

2. 26 parts of 3-methyl-5-chloro-phenyl-1-thioglycollic-2-carboxylic acid amide are dissolved in 250 parts of sulfuric acid of 66° Bé. and into this solution about 9 parts of dry chlorine are slowly introduced at about 0° C. After stirring for a prolonged time, the whole is poured on ice; the chlorination product is filtered by suction, dissolved in a cold sodium carbonate solution and after the solution has become clear, again precipitated by means of a mineral acid and then crystallized from glacial acetic acid. The 3-methyl-4.5-dichloro-phenyl-1-thioglycollic-2-carboxylic acid amide is obtained melting at 204° C. to 205° C.

3. 26 parts of the 3-methyl-5-chloro-phenyl-1-thioglycollic-2-carboxylic acid amide are dissolved in 250 parts of sulfuric acid of 66° Bé., 0.2 part of iodine are added and 24 parts of bromine are run in drop by drop, while stirring at 20° C. to 25° C.; the whole is subsequently stirred and poured on ice. The precipitated product is filtered by suction, dissolved in a cold sodium carbonate solution and after the solution has become clear, again precipitated by means of a mineral acid and then crystallized from glacial acetic acid. The 3-methyl-4-bromo-5-chloro-phenyl-1-thioglycollic-2-carboxylic acid amide thus purified melts at 195° C. to 196° C.

4. 26 parts of 3-methyl-5-chloro-phenyl-1-thioglycollic-2-carboxylic acid amide are dissolved in 250 parts of sulfuric acid of 66° Bé., to this solution 0.2 part of iodine are added and about 9 parts of dry chlorine are slowly introduced at about 0° C. After having stirred for a prolonged time, the whole is poured on ice, the chlorination product is filtered by suction, dissolved in a cold sodium carbonate solution and after the solution has become clear, again precipitated by means of a mineral acid and then crystallized from glacial acetic acid, the 3-methyl-4.5-dichloro-phenyl-1-thioglycollic-2-carboxylic acid amide is obtained, melting at 204° C. to 205° C.

Instead of sulfuric acid also other diluents may be used, such as for instance glacial acetic acid, chlorinated hydrocarbons, water or the like.

We claim:

1. The process which comprises subjecting a phenyl-1-thioglycollic-2-carboxylic acid amide to the action of a free halogen of the group consisting of chlorine and bromine in the presence of a diluent.

2. The process which comprises subjecting 3-methyl-5-chloro-phenyl-1-thioglycollic-2-carboxylic acid amide to the action of a free halogen of the group consisting of chlorine and bromine in the presence of a diluent.

3. The process which comprises subjecting 3-methyl-5-chloro-phenyl-1-thioglycollic-2-carboxylic acid amide to the action of a free halogen of the group consisting of chlorine and bromine in the presence of sulfuric acid of 66° Bé. at a temperature between about 0° C. and about 25° C.

4. The process which comprises subjecting 3-methyl-5-chloro-phenyl-1-thioglycollic-2-carboxylic acid amide to the action of bromine which is run in drop by drop, while stirring, in the presence of sulfuric acid of 66° Bé. at a temperature between about 20° C. and about 25° C.

5. The process which comprises subjecting 3-methyl-5-chloro-phenyl-1-thioglycollic-2-carboxylic acid amide to the action of a free halogen of the group consisting of chlorine and bromine in the presence of sulfuric acid of 66° Bé. and of a catalyst which favors aromatic ring halogenation at a temperature between about 0° C. and about 25° C.

6. The process which comprises subjecting 3-methyl-5-chloro-phenyl-1-thioglycollic-2-carboxylic acid amide to the action of bromine which is run in drop by drop, while stirring, in the presence of sulfuric acid of 66° Bé. and of a catalyst which favors aromatic ring halogenation at a temperature between about 20° C. and about 25° C.

7. The process which comprises subjecting 3-methyl-5-chloro-phenyl-1-thioglycollic-2-carboxylic acid amide to the action of a free halogen of the group consisting of chlorine and bromine in the presence of sulfuric acid of 66° Bé. and of a small quantity of iodine at a temperature between about 0° C. and about 25° C.

8. The process which comprises subjecting 3-methyl-5-chloro-phenyl-1-thioglycollic-2-carboxylic acid amide to the action of bromine which is run in drop by drop, while stirring, in the presence of sulfuric acid of 66° Bé. and of a small quantity of iodine at a temperature between about 20° C. and about 25° C.

In testimony whereof, we affix our signatures.

HERMANN WAGNER.
MAX HESSENLAND.
RUDOLF BRUNE.